United States Patent [19]

Hammele

[11] 4,332,528

[45] Jun. 1, 1982

[54] COMPRESSION TYPE REFRIGERATION DEVICE

[75] Inventor: Karl Hammele, Giengen, Fed. Rep. of Germany

[73] Assignee: Robert Bosch GmbH, Stuttgart, Fed. Rep. of Germany

[21] Appl. No.: 120,072

[22] Filed: Feb. 7, 1980

[30] Foreign Application Priority Data

Mar. 21, 1979 [DE] Fed. Rep. of Germany ....... 2910966

[51] Int. Cl.³ ............................................. F04B 49/06
[52] U.S. Cl. ........................................ 417/45; 62/228
[58] Field of Search ................... 62/228.3; 417/44, 45; 318/432, 481; 236/1 EA

[56] References Cited

U.S. PATENT DOCUMENTS

| 2,229,986 | 1/1941 | Page | 318/481 UX |
| 2,646,204 | 7/1953 | Rosenschold | 417/45 X |
| 3,898,527 | 8/1975 | Cawley | 62/228 D |
| 3,985,467 | 10/1976 | Lefferson | 417/45 X |
| 4,064,420 | 12/1977 | Yuda et al. | 318/481 X |

Primary Examiner—William E. Wayner
Attorney, Agent, or Firm—Michael J. Striker

[57] ABSTRACT

The compression type refrigerating device having a compressor defining a pressure space and being driven by an asynchronous motor comprises a pressure sensitive switch arranged in a sealed housing communicating with the pressure space of the compressor and connecting in response to a predetermined pressure level in the housing an additional field coil in series with a main field coil of stator of the electromotor. In this manner the efficiency of the intermittently operating asynchronous driving motor is improved.

5 Claims, 2 Drawing Figures

COMPRESSION TYPE REFRIGERATION DEVICE

BACKGROUND OF THE INVENTION

The present invention relates in general to compression refrigerators and in particular to a refrigerator of the type including a compressor driven by an asynchronous electromotor arranged in a hermetically sealed housing and having its main field winding connectable and disconnectable to a power source by a periodically activated switch.

Conventional refrigerating device of the aforedescribed type has the disadvantage that the intermittently operating asynchronous motor has an excessive consumption of electrical energy.

SUMMARY OF THE INVENTION

It is therefore a general object of the present invention to overcome the aforementioned disadvantage.

More particularly, it is an object of the invention to provide an improved compression type refrigerating device in which the electromotor driving the compressor operates with a lower power consumption.

Another object of this invention is to provide such an improved refrigerating device in which the driving electromotor is not subject to excessive heating when overloaded.

Still another object of this invention is to provide such an improved refrigerating circuit in which the breakdown torque of the electromotor is sufficiently high or adjustable to a sufficient level to match different load conditions of the motor.

A further object of this invention is to provide such an improved refrigerating circuit which has a better efficiency.

In keeping with these objects and others which will become apparent hereinafter, one feature of the invention results, in a refrigerating device including a compressor defining a pressure space and an asynchronous motor having a field winding connectable to a power source for driving the compressor, in the provision of a hermetically sealed housing communicating with the pressure space of the compressor and accommodating the driving electromotor, an additional field winding connectable to the main field winding, a pressure sensitive switch disposed in the housing and being operable for intermittently connecting in response to a predetermined pressure condition in the housing the additional winding in series with the main field winding.

The pressure sensitive switch is preferably arranged in a cup-shaped housing covered by a snap-action diaphragm which controls a switching arm of a two-position switch, the switching arm being connected via a relay to the power source, and in one position it connects the power source to a series connected additional field winding and the main winding whereas in the other position it connects to the power source the main field winding only. Preferably, there is provided an auxiliary field winding connected parallel to the main field winding.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
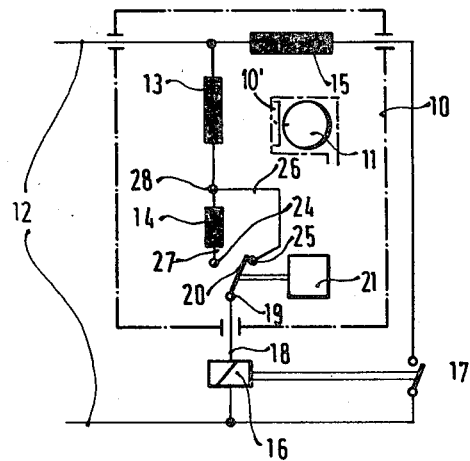
FIG. 1 shows a schematic diagram of a compression-type refrigerating device of this invention.
Figure 2:
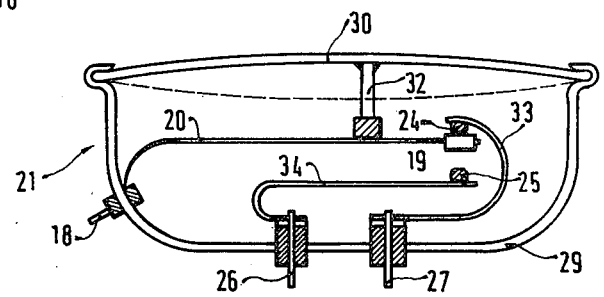
FIG. 2 is a sectional side view of a pressure sensitive switch in the device of FIG. 1.

Referring firstly to FIG. 1, the dash-and-dot box 10 designates a hermetically sealed housing communicating with a pressure space of a compressor 10'. The housing 10 encloses an asynchronous electromotor 11 including a main field winding 13, an auxiliary field winding 15 and an additional field winding 14. The rotor of the electromotor 11 drives the compressor such as a piston-type compressor in the conventional manner. Power source such as terminals 12 of an electric power-mains is connectable to the field windings of the electromotor 11 via a starting relay 16 controlling a main switch 17. The main field winding 13 is connected in series with the additional field winding 14 and the auxiliary field winding 15 is connected parallel to the windings 13 and 14. According to this invention, a pressure sensitive switch 21 is arranged within the housing 10 to connect or disconnect the additional field winding 14 from the main field winding 13 in response to a predetermined pressure level in the housing 10. As illustrated in FIG. 2, switch 21 is arranged in a cup-shaped housing 29 covered by a snap action diaphragm 30. The center of the diaphragm is provided with an inwardly directed pin 32 engaging a biased resilient switching lever or arm 20 which at one end is connected to a terminal 18 gastightly led through the wall of the housing 29. Another two gas-tight terminals 26 and 27 are connected to conductive yokes 33 and 34 the free ends of which support contacts 24 and 25 cooperating with the resilient switching arm 20. As indicated by a dashed line, the diaphragm instantly changes its shape in response to a predetermined pressure level and switches over via arm 20 from one contact 24 to the opposite contact 25. The terminal 18 of the resilient switch arm 20 is connected via relay 16 to one terminal of the power source 12, whereas the contact 24 is connected to one terminal of the additional field winding 14 and the other contact is connected via conduit 26 to the connection point 28 between the additional winding 14 and the main field winding 13.

The contact arm 20 engages either the contact 24 or 25 in response to the pressure level in housing 10. If the pressure level is low, then the diaphragm 30 arches outwardly and the contact arm 20 engages the contact 24 through which the additional winding 14 is connected via connector 27 in series with the main field winding 13. As a result, the breakdown torque of the motor is reduced. If, however, the pressure in the interior of housing 10 builds up to attain an upper limit value, then the diaphragm 30 snap arches inwardly and its pin 32 urges resilient arm 20 into engagement with a contact 25 which connects the connection point 28 at the end of the main field winding 13 directly through the coil of relay 16 and therethrough to the power source terminal 12 thus disconnecting the additional winding 14 from the main winding 13. In this manner, the breakdown torque of the electromotor increases whereby the connection of the auxiliary field winding 15 and of the relay 16 remains the same. Accordingly, by virtue of the load responsive switchover of the tap 28 in the main field winding, the breakdown torque of the motor is always adjusted to the momentary load condition. In this manner, it is possible to take the advantage of relatively weak electromotor which is inexpensive and has low losses at a torque of a heavy-duty motor. As known, the required torque or torsional moment is dependent on the momentary pressure condition at the suction end of the compressor; the influence of the compression end of the compressor on the torsional moment is relatively low and in the first approximation can be disregarded.

The pressure sensitive switch 21 is to be so adjusted as at a normal operation within the desired application range, the field windings 13 and 14 be connected in series. As soon as the suction pressure in the compressor starts increasing, for example, due to the insertion of an increased amount of articles into the refrigerator initiating the operation of the refrigerating device, the pressure sensitive switch 21 switches over to a smaller field winding (the additional field winding 14 becomes disconnected as explained above), and the motor has an increased initial rotary moment $M_d$ and as the case may be also an increased power.

Figure 3:
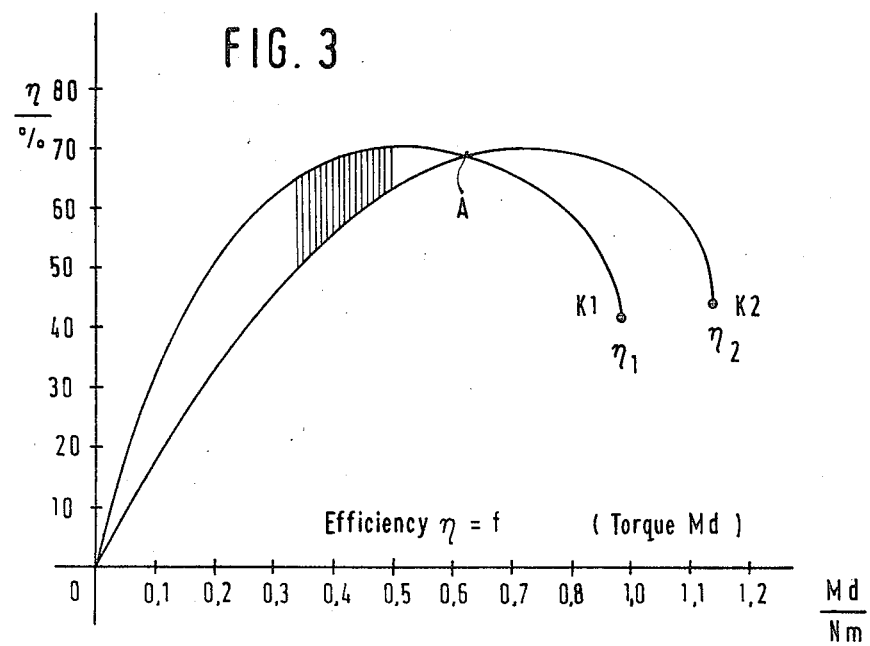
FIG. 3 is a plot diagram of the relation between the torque of the driving electromotor and of its efficiency in the device of FIG. 1.

The diagram of FIG. 3 shows on its abscissa the rotary moment of the electromotor and on its ordinate the efficiency of the electromotor. The resulting two curves $N_1$ and $N_2$ denote, respectively, the efficiency of the electromotor during its operation at a lower load ($N_1$) at which the additional field winding 14 is series connected with the main field winding 13, and efficiency ($N_2$) at a higher load at which the additional winding 14 is disconnected. The respective breakdown torques are designated by reference characters $K_1$ and $K_2$. The most favorable point for switching over the additional field winding is at point A, where the two curves $N_1$ and $N_2$ intersect. The saved energy is indicated by hatched surface.

As soon as the refrigerating device attains its normal operating condition the suction pressure drops below a predetermined value corresponding to the decreased load and the pressure sensitive switch reconnects the additional winding 14 in series with the main field winding and consequently a more advantageous idling or low load operation of the electromotor is attained. The resulting lower consumption of the electrical energy in the long run provides for a more economical operation of the refrigerating circuit and also for a lower heating of the driving electromotor.

Due to the higher efficiency and higher load corresponding to the curve $N_2$ current flow through the motor is also reduced and consequently inasmuch as the excessive current might cause a response of the motor switch prior to the actual breakdown torque, a premature interruption of the cooling process is thus prevented. In the event of momentary load peaks the breakdown torque is increased.

The refrigerating device of this invention has the following additional advantages: at a cold start with a lower voltage and with high pressures at the suction side of the compressor there is increased, apart from the breakdown torsional moment, also the starting moment of the electromotor and consequently the overall starting condition of the refrigerating device is considerably improved. The arrangement of this invention can be in principle used in connection with any asynchronous motor, such as, for example, a condenser motor or a motor having a PTC (positive temperature coefficient resistor) starting circuit. The latter motor has the advantage that there is no necssity for taking a count of the currents flowing through the relay.

The switch 21 can be arranged between the windings or inside the windings. It is also possible to combine the switch with a three-contact plug and socket arranged outside or inside the space for the windings or to combine the pressure sensitive switch with the main switch for the motor.

It will be understood that each of the elements described above, or two or more together, may also find a useful application in other types of constructions differing from the types described above.

While the invention has been illustrated and described as embodied in a specific example of a refrigerating device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A compression type refrigerating device including a compressor defining a pressure space, a hermetically sealed housing communicating with said pressure space, an asynchronous motor arranged in said housing and having a main field winding connectable to a power source for driving said compressor and an additional field winding, a pressure sensitive switch arranged in said housing and operable for intermittently connecting said additional field winding in series with said main field winding in response to a predetermined pressure level in said housing.

2. The refrigerating device as defined in claim 1, wherein said pressure sensitive switch is a two-position switch including a cup-shaped housing covered by a diaphragm, and within said cup-shaped housing a resilient switching lever movable between two contacts in response to the position of said diaphragm.

3. The refrigerating device as defined in claim 2, further including a relay operated main switch for connecting said field windings to said power source.

4. The refrigerating device as defined in claim 3, wherein said resilient switching lever is connected to a terminal of said power source via said relay, one of said contacts being connected to one end of said additional field winding and to a free end of said main field winding, and the other contact being connected to the free end of said additional field winding.

5. The refrigerating device as defined in claim 3 further including a second main winding connectable parallel to said first mentioned main field winding via said main switch.

* * * * *